United States Patent [19]
Kalis, Jr.

[11] Patent Number: 5,788,437
[45] Date of Patent: Aug. 4, 1998

[54] CARGO TIE DOWN ASSEMBLY AND METHOD OF USE

[75] Inventor: George Kalis, Jr., Wooster, Ohio

[73] Assignee: Stahl.Scott Fetzer Company, Wooster, Ohio

[21] Appl. No.: 587,419

[22] Filed: Jan. 16, 1996

[51] Int. Cl.$^6$ ..................................... B60P 7/08
[52] U.S. Cl. .................. 410/107; 410/98; 410/106; 410/108; 410/111
[58] Field of Search .................... 410/101, 106, 410/107, 108–112, 98; 242/499, 503; 24/115 K, 265 CD; 296/43

[56] References Cited

U.S. PATENT DOCUMENTS

| | | | |
|---|---|---|---|
| 2,722,898 | 11/1955 | Beauchamp | 410/108 |
| 3,007,422 | 11/1961 | Brotton | 410/107 |
| 3,595,125 | 7/1971 | Jacobs | 410/106 |
| 3,837,702 | 9/1974 | Case | 296/43 X |
| 4,242,022 | 12/1980 | Fredrickson | 410/107 |
| 4,453,761 | 6/1984 | Felburn | 296/43 |
| 4,607,991 | 8/1986 | Porter | 410/110 |
| 4,715,754 | 12/1987 | Scully | 410/107 |
| 5,106,248 | 4/1992 | Harris | 410/107 |
| 5,443,341 | 8/1995 | Hamilton | 410/106 X |
| 5,444,897 | 8/1995 | Gross | 410/107 X |

FOREIGN PATENT DOCUMENTS

| | | | |
|---|---|---|---|
| 714827 | 8/1965 | Canada | 410/101 |
| 4000722 | 7/1991 | Germany | 410/111 |
| 62-15142 | 1/1987 | Japan | 410/107 |

OTHER PUBLICATIONS

Product brochure of the Knapheide Mfg. Co., date unknown 8 pages.
Product brochure of Supreme Corporation, 4 pages, no date.
Specification Sheet of Knapheide Mfg. Co's Cargo Tie Dawn, dated Jan. 23, 1995, 1 page.

Primary Examiner—Stephen T. Gordon
Attorney, Agent, or Firm—Watts, Hoffmann, Fisher & Heinke Co.

[57] ABSTRACT

A cargo tie down assembly and method of use thereof for a vehicle platform. The tie down assembly includes a tie down member for securing cargo on such a vehicle platform. The tie down member has an opening therethrough. An anchor is adapted to extend in a first opening in a rail of such a vehicle platform. The anchor extends across the opening in the tie down member for restricting movement of the tie down member between an operative and a retracted position.

18 Claims, 5 Drawing Sheets

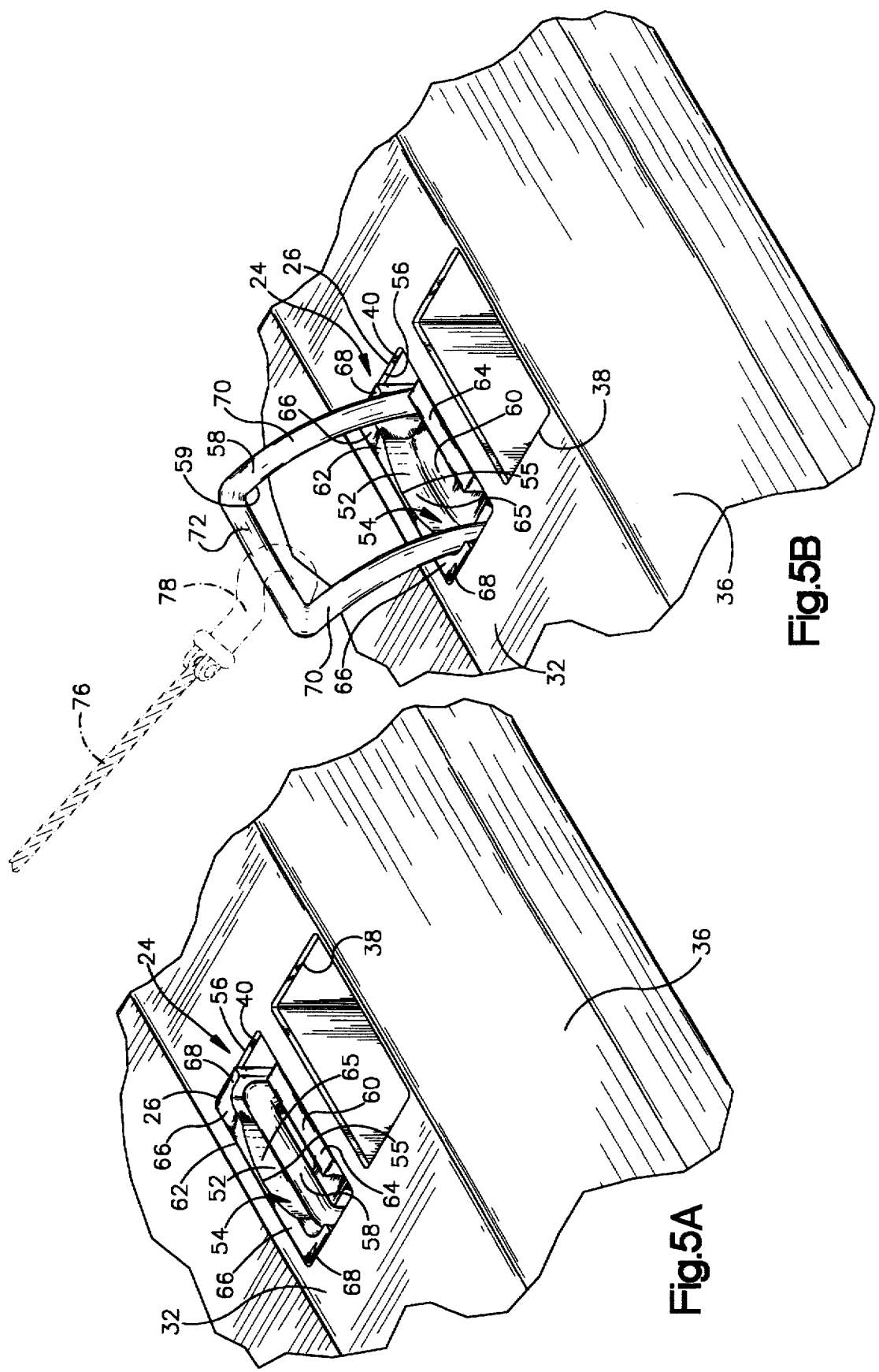

CARGO TIE DOWN ASSEMBLY AND METHOD OF USE

FIELD OF THE INVENTION

The present invention relates to vehicle platforms and, in particular, to cargo tie down assemblies used on truck platforms.

BACKGROUND OF THE INVENTION

Trucks such as flatbed trucks have a steel platform supported by a chassis of the truck. The platform includes two side rails spaced apart from each other and extending along the length of the truck, and two end rails spaced apart from each other and extending along the width of the truck. The platform is structurally reinforced by members commonly known as long sills extending along the length of the truck and by cross members extending along the width of the truck. The side and end rails include pockets formed by a vertical wall extending between upper and lower surfaces of the rails. A stake body having vertical stakes is supported by the platform when the vertical stakes are disposed in the pockets. A floor for supporting the cargo is located in the area circumscribed by the side and end rails.

The platform may include tie down assemblies for securing the cargo in place on the floor. Such tie down assemblies typically include a cylindrical cup-shaped member that fits into an opening in the floor. A D-shaped tie down member is pivotally mounted in the cup member. When in use the tie down members are pivoted out of the cup member into an upstanding operative position. Fasteners such as ropes are attached to the tie down members and extend across the cargo to keep the cargo in place on the floor. When not in use the tie down members are pivoted below the surface of the floor and are received by the cup members.

Due to their locations on the floor, such tie down member assemblies are disadvantageous. The cargo may interfere with the tie down assemblies, and wide loads may even cover the tie down members, making securing the cargo difficult. Also, the cup members must receive the D-shaped tie down members when the tie down members are not in use. Thus, the cup members occupy a considerable amount of space on the floor.

SUMMARY OF THE INVENTION

The present invention relates to cargo tie down assemblies for vehicle platforms. The cargo tie down assemblies do not occupy any space on the platform floor, so they are not easily covered by the cargo. Each of the cargo tie down assemblies of the present invention generally includes a tie down member for securing cargo on the vehicle platform. The tie down member has an opening therethrough. An anchor is adapted to extend in a first opening in a rail of the vehicle platform. The anchor extends across the opening in the tie down member for restricting movement of the tie down member between an operative and a retracted position.

More specifically, the first opening is adjacent a second opening in the rail, the second opening being for receiving a stake pocket. The rail includes upper and lower surfaces, and the pocket is defined by a vertical wall extending between the upper and lower rail surfaces. The tie down member is a preferably a continuous, substantially rectangular body that is arcuate along a direction of its length. The anchor has upper and lower abutment surfaces and defines a recess adjacent the upper abutment surface. The tie down member contacts the lower abutment surface in the operative position and the upper abutment surface in the retracted position. The tie down member is disposed in the recess in the retracted position. The anchor has surfaces which, together with the interior rail surfaces, define openings that communicate with an interior of the rail and the recess. These openings receive the tie down members.

In a preferred embodiment, the truck platform includes rails circumscribing a region for receiving a floor, the rails including pockets for receiving vertical stakes, and tie down assemblies for securing cargo on the floor. The rails include two side rails spaced apart from each other extending along a length of the truck. Two end rails are spaced apart from each other and extend between the side rails along a width of the truck. The end rails are connected to opposite ends of the side rails. Each of the first tie down cutout openings is disposed adjacent a second opening for receiving an associated one of the pockets. An anchor is provided for each associated tie down member.

The tie down assemblies of the present invention are advantageous because they are not disposed on the floor of the platform, and thus are not easily covered by cargo on the floor. In addition, the present tie down assemblies conserve space compared to the conventional cup members and D-shaped members, because the cup members must be large enough to accommodate the entire D-shaped member. In contrast, the tie down members of the present invention are moved into an interior of the rails when not in use. Thus, the tie down cutouts need not be of a size to accommodate the length of the tie down member, as in the prior art.

A method of securing cargo on a floor of a truck platform in accordance with the present invention includes the step of positioning two or more anchors to extend across an opening in an associated tie down member. The tie down members and the anchors are positioned in a first opening in a rail of a vehicle platform. Each of the tie down members is moved into an operative position in which a lower abutment surface of the anchor is in contact with the tie down member. Each of the tie down members is moved into a retracted position in which each of the upper abutment surfaces is in contact with the associated tie down member. In the retracted position each tie down member is disposed in a recess defined by the associated anchor.

More specifically, the tie down members are located above a plane of a floor of the platform in the operative position. Fasteners are connected to the tie down members and against the cargo when the tie down members are in the operative position. The fasteners are disconnected from the tie down members and the tie down members are moved into the associated recesses to a retracted position preferably below the plane of the floor.

Other embodiments of the invention are contemplated to provide particular features and structural variants of the basic elements. The specific embodiments referred to as well as possible variations and the various features and advantages of the invention will become better understood from the detailed description that follows, together in connection with the accompanying drawings.

BRIEF DESCRIPTION OF THE DRAWINGS

FIG. 3A is an enlarged partial cross-sectional view of a side rail of the platform showing a stake pocket, as taken from the region designated 3A in FIG. 3;

FIG. 5A is enlarged perspective view of the tie down assembly of the present invention shown in a retracted position, as taken from the region designated 5A in FIG. 2; and FIG. 5B is enlarged perspective view of the tie down assembly of the present invention shown in an operative position in which a fastener is connected to the tie down member, as taken from the region designated 5B in FIG. 2.

DETAILED DESCRIPTION OF PREFERRED EMBODIMENTS

Figure 1:
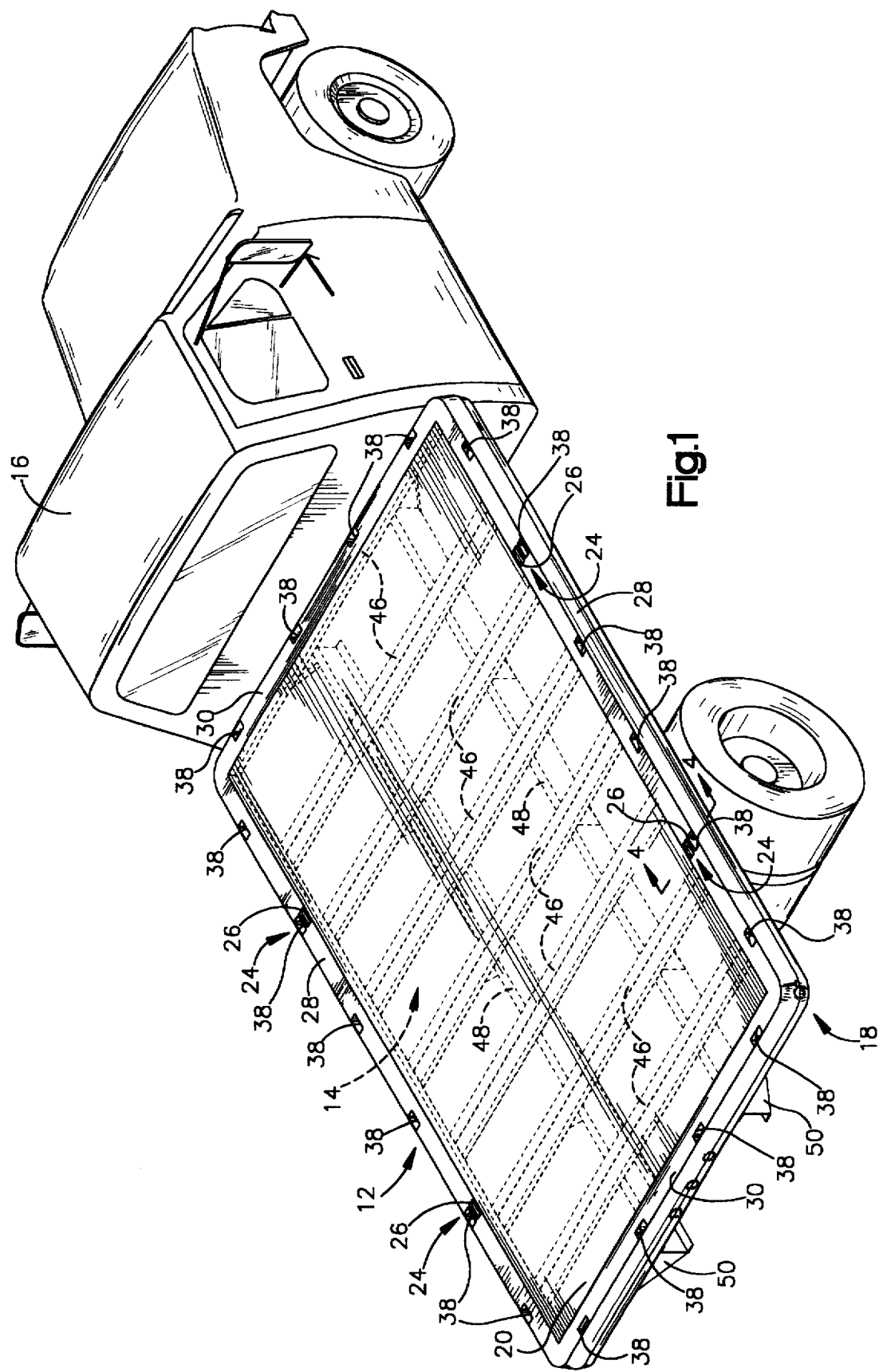
FIG. 1 is a perspective view of a truck having a platform constructed in accordance with the present invention.
Figure 2:
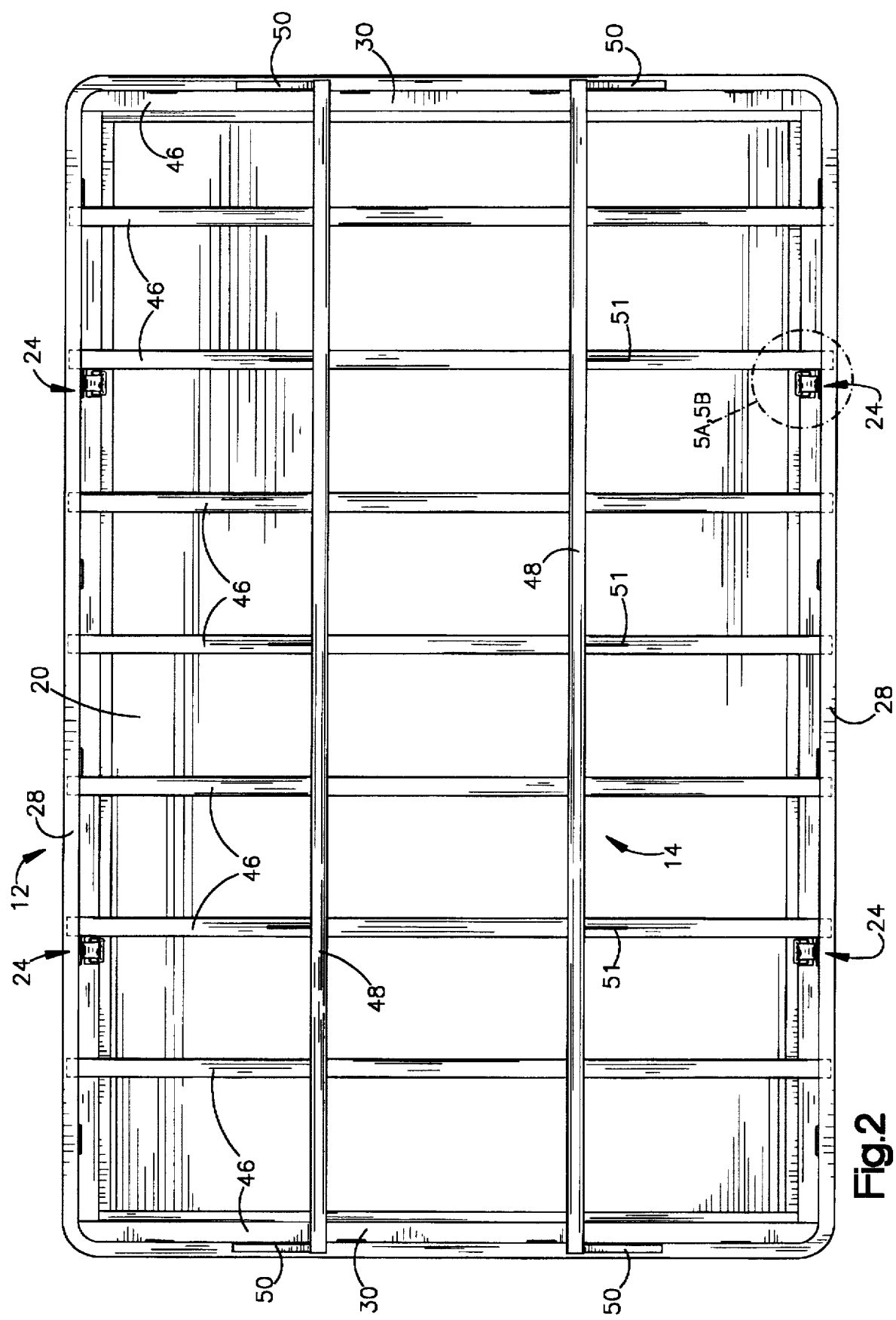
FIG. 2 is a bottom plan view of the platform of the invention.
Figure 3:
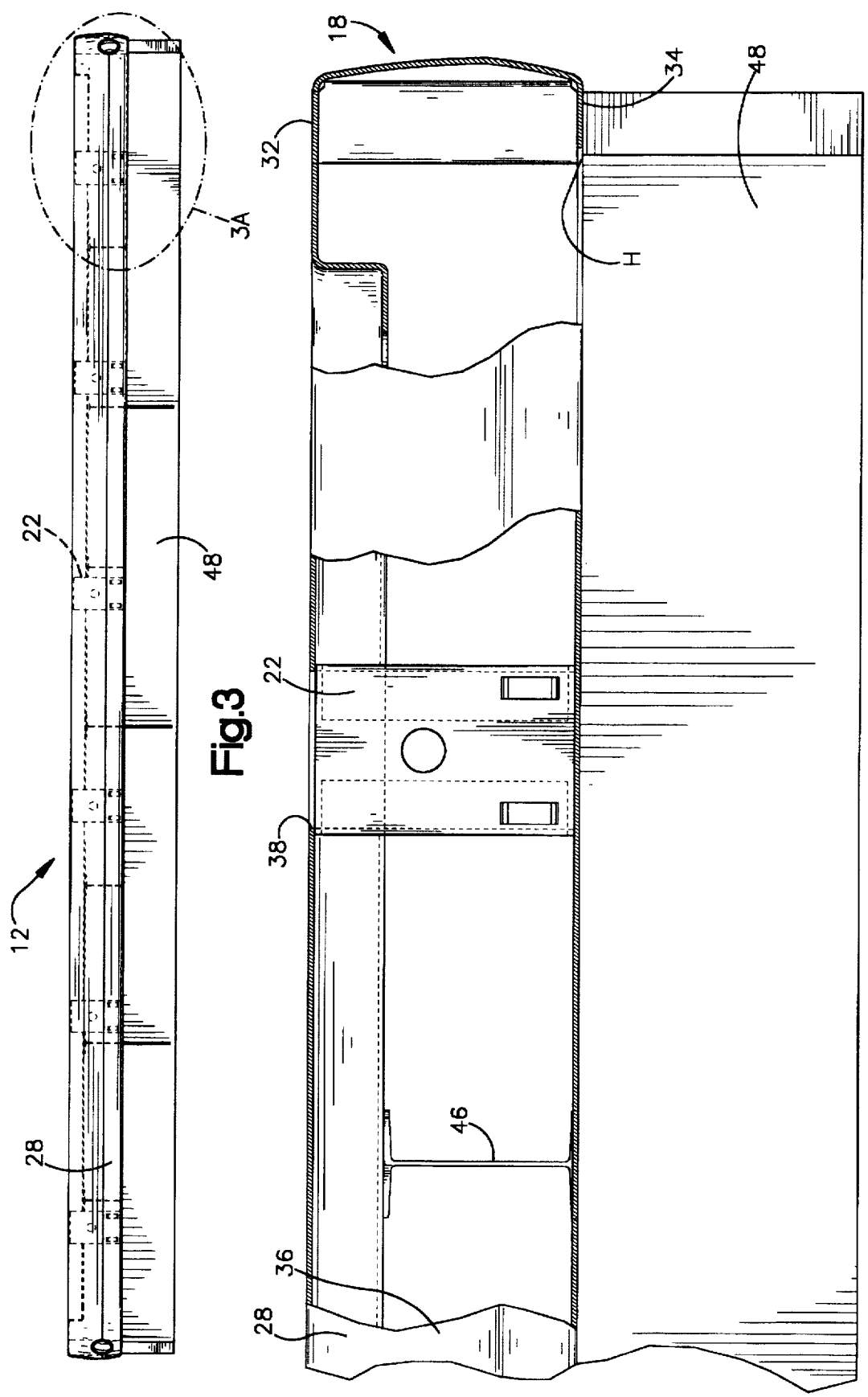
FIG. 3 is a side elevational view of the platform of the invention.

Turning now to the drawings, FIGS. 1 and 2 show a platform 12 with structural support members 14. The platform 12 is disposed on a chassis (not shown) of a flatbed truck 16. The platform 12 includes hollow rails shown generally at 18 that circumscribe a region in which a floor 20 is disposed. Each of the rails 18 has pockets 22 (FIGS. 3 and 3A) for receiving vertical stakes of a stake body (not shown). The platform 12 includes cargo tie-down assemblies 24 that are mounted in an associated one of first tie down cutout openings 26 in the rails 18.

The rails 18 include two side rails 28 spaced apart from each other, which extend along a length of the truck. The rails 18 also include two end rails 30, which are spaced apart from each other and extend between the side rails 28 along a width of the truck. Each of the end rails 30 is connected to an opposite end of the side rails 28. The side and end rails 28, 30 may be formed of any suitable structural steel member, such as 12 gauge high strength steel. The platform 12 may have any width, such as 96 inches, and any length, such as 24 feet 5 inches. The platform 12 can fit onto any size truck and accommodate any size stake body.

Figure 4:
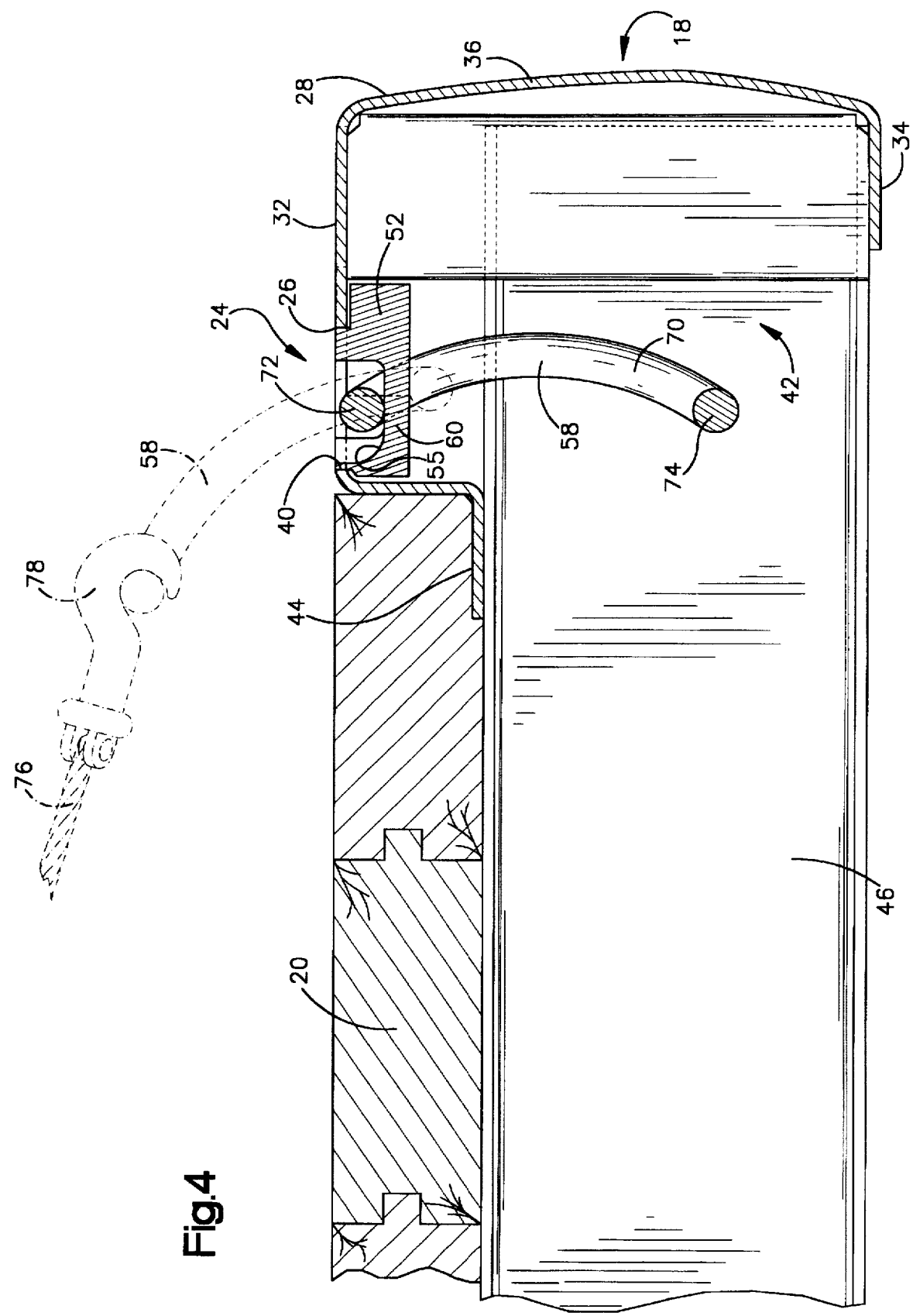
FIG. 4 is an enlarged cross-sectional view of a tie down assembly constructed according to the present invention taken along lines 4—4 of FIG. 1.

Turning now to FIGS. 3A and 4, it will be seen that the rails 18 include upper and lower surfaces 32, 34 and a side surface 36 extending between the upper and lower surfaces 32, 34. The pockets 22 are formed by a vertical wall which is disposed in the interior of the side and end rails 28, 30 and extends between the upper and lower rail surfaces 32, 34. Each of the pockets 22 communicates with a second associated pocket cutout opening 38 formed in the upper rail surface 32. The pocket cutouts 38 may be any suitable size, one suitable size being 3.66×1.66 inches. The pockets 22 may also be any suitable size, one suitable size being 5.5 inches in length, 3.56 inches in width and 1.76 inches deep.

The tie down cutouts 26 are formed in the upper surfaces 32 of the side rails 28 preferably adjacent the pocket cutouts 38. The tie down cutouts 26 are defined by interior surfaces 40 of the side rails 28 and communicate the area outside the rail upper surfaces 32 of the side rails 36 with the interior 42 of the side rails 28. The tie down cutouts 26 may be any suitable size, and are preferably the same size as the pocket cutouts 38. Each of the tie down assemblies 24 is disposed in a tie down cutout 26 and can be accommodated within the side rail interior 42.

The side rails 28 also include a shoulder 44 for supporting the floor 20. The floor 20 may be formed of any material such as wood, steel, or wood with a steel overlay. One example of a suitable wood floor comprises 2×4 inch tongue and groove boards.

As shown in FIG. 2, the support members 14 include cross members 46 that extend across the width of the truck 16 into the side rail interior 42 between the upper and lower surfaces 32, 34 of the side rail 28. The support members 14 also include long sills 48 preferably disposed underneath the cross members 46 and extending along the length of the truck 16. Gussets 50 may also be disposed underneath the platform 12. Other structural supports including support members 51 may also be used as will be apparent to those skilled in the art. The cross members 46 are welded to the side rails 28. The long sills 48 are welded to the cross members 46. The gussets 50 are welded against the long sills 48 and the cross members 46. The long sills 48 and the cross members 46 are welded to the truck chassis.

The cross members 46, the long sills 48, the gussets 50 and the support members 51 may be formed of structural steel members of any suitable size, gauge, and spacing. For example, the cross members 46 may be 4 inch I-beams with a 3.2 pounds/foot nominal weight at 18 inch spacing between centers. The long sills 48 may be 6 inch structural long sill channels with a 34 inch spacing between centers. More specifically, 12 gauge high strength steel may be used for the cross members 46, the long sills 48, the gussets 50 and the support members 51.

Referring to FIGS. 4, 5A, and 5B, each of the tie down assemblies 24 includes an anchor 52 disposed in an associated one of the tie down cutouts 26. The anchors 52 are preferably welded to the upper rail surfaces 32 of the side rails 28. Each of the anchors 52 has surfaces 54 which, together with the interior side rail surfaces 40, define a recess 55 and openings 56. The openings 56 communicate with the recess 55 and the side rail interior 42. Each of the tie down members 58 is connected to an associated one of the anchors 52 for movement in the openings 56.

Each of the anchors 52 preferably includes a body portion 60 having first and second opposing end portions 62, 64. The body portion 60 preferably has a curved portion 65, which forms a region in which one's hand can fit for gripping the tie down members 58 when they are in the retracted position. Two shoulders 66 are each preferably connected to a side of the first body end portion 62. Each of the shoulders 66 preferably has an arm portion 68 spaced apart from the body portion 60 in a direction in which the side rails 28 extend.

When the anchors 52 are mounted in an associated one of the tie down cutouts 26, portions of the body portion 60, the shoulders 66, and the arms 68 contact the interior side rail surface 40. The anchors 52 are fastened to the rails 28 such as by welding. The recess 55 and the two openings 56 are defined by each of the anchors and the associated interior rail surfaces 40. More specifically, each recess 55 and one of its associated openings 56 are defined by surfaces of one side of the body portion 60, one of the shoulders 66 and one of the arms 68, together with the interior side rail surface 40.

Each of the tie down members 58 includes two sides 70 and first and second ends 72, 74, as best shown by FIGS. 4 and 5B. Each tie down member has an opening 59 therethrough. Each of the sides 70 is received in an associated one of the openings 56. The tie down members 58 may be any shape, as long as they can protrude from the anchor 52 enough to be fastened in the operative position and be received by the openings 56, preferably below the upper rail surface 32, when in the retracted position. The tie down members 58 may be straight or planar, and preferably have a continuous, substantially rectangular shape. The tie down members 58 may also be formed in a ring shape.

The tie down members 58 preferably have a curvature along a length of their sides 70 as best shown in FIG. 4. The tie down members 58 may have any curvature that permits them to be moved, such as by sliding, out of the rail interior 42 into an operative position so that the second tie down member ends 74 contact the lower surface of the anchors 52. The curvature of the tie down members 58 may vary depending upon the distance between the upper and lower rail surfaces 32, 34, the sizes of the tie down members 58 and the anchors 52, and the size of the tie down cutouts 26, one suitable tie down member curvature is a 3.34 inch radius through an arc of 70.23 degrees.

The cargo tie down assemblies 24 of the present invention can be used to secure cargo on the platform floor 20 in the following manner. The tie down cutouts 26 are formed in the upper rail surfaces 32 of the truck platform 12. The tie down members 58 are connected to the anchors 52 so that the anchors extend across the openings 59. The anchors 52 are welded to the upper surfaces 32 of the side rails 28 in an associated one of the tie down cutouts 26. When the anchors 52 are in position, the two openings 56 are defined and communicate with the side rail interior 42. Each of the tie down members 58 is disposed in the openings 56 in an associated one of the tie down cutouts 26. As shown in FIG. 3A, a lower surface of a fail 18 includes a hole H.

To secure the cargo on the platform floor 20, each of the tie down members 58 is slid out of the side rail interior 42 into the operative position where the second end 74 of the tie down member 58 engages the lower surface of an associated one of the anchors 52. In the operative position, the first ends 72 of the tie down members 58 extend above the plane of the floor 20. Fasteners such as ropes or cables 76, which may be secured to hooks 78, are connected to the tie down members 58 between the side rails 28. The ropes 76 are pulled tightly against the cargo to secure the cargo on the platform floor 20.

When it is desired to unload the cargo from the platform, the fasteners 76 are removed from the tie down members 58. The tie down members 58 are then slid into a retracted position in which the second ends 74 move further into the side rail interior 42. In the retracted position each of the first end portions 72 of the tie down members 58 engages the upper surface of its associated anchor 52. The first end portions 72 of the tie down members 58 are now disposed in the recesses 55 in a position preferably flush with or below the plane of the upper rail surfaces 32.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. A vehicle platform, comprising
a substantially horizontally extending support surface on which cargo can be supported,
at least two tie down members for securing cargo to said support surface, each said tie down member having an opening therethrough, and
at least two anchors each disposed in an opening in said support surface, each of said anchors comprising stop means for restricting movement of an associated said tie down member substantially vertically to generally linear plane motion between an operative position in which the associated said tie down member is disposed above said support surface and a retracted position below said support surface into which the associated said tie down member moves by force of gravity, wherein each said stop means is disposed below said support surface and comprises a surface that extends through the opening in the associated said tie down member.

2. The platform of claim 1 wherein said support surface comprises a hollow rail and a floor circumscribed by said rail and said rail comprises each said support surface opening and openings constructed and arranged to receive vertical stakes.

3. The platform of claim 2 wherein said rail comprises an upper surface in which each said support surface opening is disposed and a lower surface in which another opening is disposed.

4. The platform of claim 2 wherein each said tie down member comprises two vertically extending legs and two horizontally extending legs and each said anchor includes two contoured portions, wherein each said contoured portion and said rail form a travel opening for receiving one of said vertically extending legs.

5. The platform of claim 4 wherein each said travel opening permits the generally linear plane motion of said tie down members.

6. The platform of claim 4 wherein each said anchor includes a channel extending between said contoured portions for receiving an associated said tie down member and enabling the associated said tie down member to be positioned beneath said support surface in said retracted position.

7. The platform of claim 1 wherein each said tie down member is a continuous substantially rectangular body.

8. The platform of claim 1 wherein an upper surface of each said anchor extends substantially flush with said support surface.

9. The platform of claim 1 wherein each said tie down member is adapted to float freely relative to said associated anchor by being constructed without a fixed hinge.

10. In a vehicle platform including a hollow rail circumscribing a floor, the rail having a substantially horizontal upper surface and at least two tie down assemblies being connected to said rail for securing cargo to the floor, the improvement wherein each said tie down assembly comprises a tie down member having an opening therethrough, and
an anchor disposed in an opening in the upper surface of said rail, each said anchor comprising stop means for restricting movement of an associated said tie down member substantially vertically to generally linear plane motion between an operative position in which the associated said tie down member is disposed above said floor and a retracted position below said floor into which the associated said tie down member moves by force of gravity, wherein said stop means is disposed below said floor and comprises a surface that extends through the opening in the associated said tie down member.

11. The improvement of claim 10 wherein each said tie down member is a continuous substantially rectangular body.

12. The improvement of claim 10 wherein said rail comprises a lower surface in which another opening is disposed.

13. The improvement of claim 10 wherein each said tie down member is adapted to float freely relative to said associated anchor by being constructed without a fixed hinge.

14. A method for securing cargo to a substantially horizontal support surface of a vehicle, comprising the steps of positioning stop surfaces of at least two anchors such that each said stop surface extends through an opening in an associated tie down member,
positioning each said tie down member and the associated said anchor in an opening in the support surface, connecting said anchors to said support surface, restricting movement of each said tie down member substantially vertically to generally linear plane motion, moving each said tie down member upwardly into an operative position in which said tie down member contacts a lower abutment portion of an associated said stop surface and extends above said support surface, and releasing each said tie down member to enable said tie down member to move below said support surface by force of gravity to a retracted position in which said tie down member contacts an upper abutment portion of an associated said stop surface.

15. The method of claim 14 further comprising connecting a fastener to each said tie down member and against the cargo when each said tie down member is in the operative position.

16. The method of claim 15 further comprising the steps of disconnecting each said fastener from an associated said tie down member and moving the tie down member into a recess formed by an associated said anchor to said retracted position.

17. A method for securing cargo on a substantially horizontal support surface of a vehicle, comprising the steps of restricting movement of tie down members substantially vertically to generally linear plane motion using stop members disposed below said support surface, wherein each said stop member extends through an opening in an associated said tie down member, moving each said tie down member upwardly into an operative position in which said tie down member contacts an associated said stop member and extends above said support surface, connecting fasteners to said tie down members, securing cargo to said support surface, disconnecting said fasteners from said tie down members, and releasing each said tie down member to enable said tie down member to move below said support surface by force of gravity to a retracted position in which said tie down member contacts an associated said stop member.

18. The method of claim 17 comprising locating each said tie down member at a peripheral portion of said support surface thereby making it difficult to cover each said tie down member by said cargo.

* * * * *